United States Patent [19]

Bayne et al.

[11] 4,089,449
[45] May 16, 1978

[54] SPARE TIRE MOUNT DEVICE

[76] Inventors: Ralph H. Bayne, 54710 N. Ave., Mt. Clemens, Mich. 48043; Vestel Fields, 14725 Tacoma St., Detroit, Mich. 48205

[21] Appl. No.: 642,149

[22] Filed: Dec. 18, 1975

[51] Int. Cl.² ............................................. B62D 43/08
[52] U.S. Cl. .................................. 224/42.24; 248/163
[58] Field of Search ................ 224/42.12, 42.2, 42.21, 224/42.24, 42.25, 42.26, 42.45 R, 42.03 R, 42.03 B, 42.06; 296/37.2; 248/203, 163; 70/58, 259, 260

[56] References Cited
U.S. PATENT DOCUMENTS

| 1,297,942 | 3/1919 | Wahrenberger | 224/42.24 |
| 1,519,751 | 12/1924 | Baker | 224/42.24 |
| 1,765,785 | 6/1930 | Baker | 224/42.24 |
| 1,978,673 | 10/1934 | Holford et al. | 224/42.24 X |
| 2,316,440 | 4/1943 | Levine | 248/163 X |
| 2,772,826 | 12/1956 | Krengel | 224/42.24 |
| 2,980,376 | 4/1961 | Westerfield | 248/163 X |
| 3,425,605 | 2/1969 | Triboulet | 224/42.06 |
| 3,613,972 | 10/1971 | Daughhettee | 224/42.24 |
| 3,843,033 | 10/1974 | Wirth, Sr. | 224/42.24 |
| 3,940,178 | 2/1976 | Leveque | 224/42.24 |

Primary Examiner—Trygve M. Blix
Assistant Examiner—Winston H. Douglas
Attorney, Agent, or Firm—Gerald R. Hershberger

[57] ABSTRACT

A rigidly constructed tire mount device comprised preferably of welded constructed elements including a trunk member adapted to be bolted or otherwise fastened to the floor of the pick-up truck box and under the flange of the pick-up truck box directly above the floor along the side of the pick-up box side wall, two diagonal brace members welded edgewise to said vertical member and a extending diagonally to the pick-up box floor at approximately a 45° included angle, shoe members welded to the bottom ends of said vertical member and said diagonal members for fastening said device to the floor of said truck and a shoe member welded to the upper portion of said vertical member for fastening or bolting said vertical member to the upper flange of said pick-up truck box, a cantilevered generally annular hollow tube member welded to said vertical member substantially below the upper shoe of said vertical member, a flat generally annular plate welded to the end of said arm member and being provided with studs for engaging the mounting holes on a typical spare tire. An extension post or bar is welded centrally to said backing plate and extends horizontally parallel to said horizontal arm member. A locking plate is slipped over said extension bar and a padlock or locking pin may then be inserted through an opening in said extension bar locking said spare tire to said backing plate.

1 Claim, 3 Drawing Figures

SPARE TIRE MOUNT DEVICE

BACKGROUND OF THE INVENTION

1. Field of the Invention

This invention relates to spare tire mounting devices and more particularly to a vary rigidly constructed spare tire mount which is preferably mounted on the inside wall of the pick-up truck box, and wherein the spare tire maybe locked securely effectively and efficiently to said tire mount with a minimum of difficulty.

2. Description of the Prior Art

Devices of this general character are known in the prior art for carrying spare tires on trucks having an open pick-up body, however, in the known devices such devices are unwieldly and complicated to use, are weak and flimsy and will not secure the spare tire fixedly to said pick-up body in a rigid manner, or they are expensive to make and difficult to use. Further there are no efficient anti-theft locking devices proposed or developed in the prior art.

SUMMARY OF THE INVENTION

Accordingly the problems and difficulties encountered in the prior art are obviated by the present invention in which we provide a tough torsion resistant, rigid spare tire carrier mount for carrying the spare tire conveniently within the pick-up box of said truck. We have constructed our device using the arc-welding process to ensure rigid and shake proof operation, particularly when the vehicle is stopped and started quickly.

An object of our invention is stated in the above abstract of disclosure.

Another and further object of this our invention is to provide a spare tire mount for a pick-up truck having an open rear box, or bed, which mount is constructed using the arc-welding process, rigidly and permenantly fixing the stationary members thereof to each other to form a sturdy rigid shake proof tire mount assembly when welded together.

It is further object of this our invention to provide a spare tire mount for a pick-up truck having a central, fixed steel vertical column member and adjacent diagonal elongated, generally flat, steel members fastened to said central column member end extending outwardly at their bases for fastening longitudinally to the side of said truck to offsett the torque developed by the stopping and starting of the motor vehicle.

It is a further object of this our invention to provide a simple positive clamping procedure for holding the spare tire rim to said mount and including therewith a simple but efficient anti-theft locking means for securing said spare tire to said mount.

Other further objects of this our invention will become apparent from the following description of the drawing the description of the preferred embodiment and the appended claims.

BRIEF DESCRIPTION OF DRAWING

The present invention maybe better understood and numerous other features and advantages thereof will become apparent to those skilled in the art by reference to the accompanying drawing wherein like reference numerals refer to like elements in the various figures in which.

DESCRIPTION OF THE PREFERRED EMBODIMENT

Figure 1:
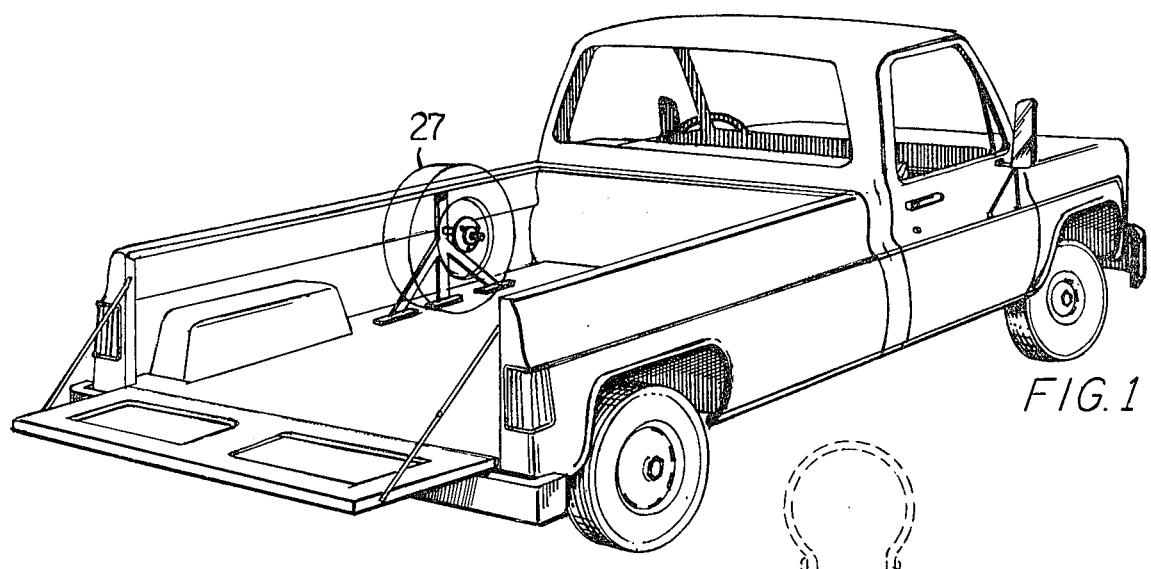
FIG. 1 is a perspective view of our novel spare tire mount device showing the mount device mounted to the pick-up truck box and a spare tire mounted to said mount in typical fashion with the anti-theft locking device in place.
Figures 2, 3:
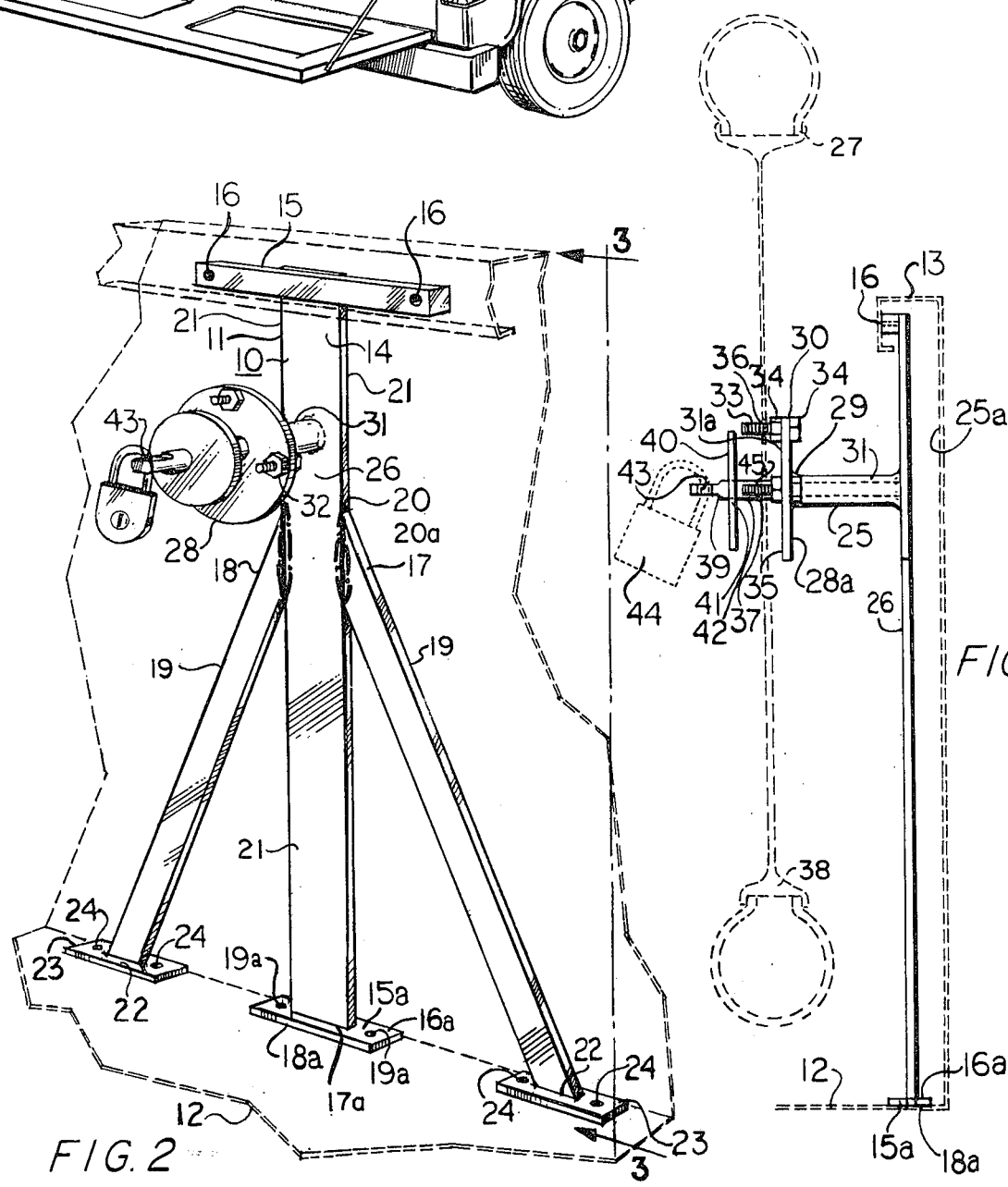
FIG. 2 is a frontal perspective view of our device showing the construction thereof in detail.
FIG. 3 is a side view of our device taken in direction of line 3 — 3 of FIG. 2.

Referring now in detail to the drawing and to particularly FIG. 1 thereof. Our spare tire mount is denoted generally by the numeral 10. It is shown as including a primary elongated generally rectangular substantially thick and heavy strip stock steel post or trunk member 11 extending from the floor 12 of said box to adjacent the top or edge 13 of said box. A smaller, generally flat, elongated square outlined fastening portion or mounting bracket flange, or shoe member 15 is arc-welded transversely and fixedly to the top end inside face 14 of said primary trunk. Mounting holes 16 are provided in said primary shoe member for fastening said primary trunk by bolts and nuts (not shown) to said top edge of said pick-up truck box. A rectangulary outlined generally flat strip stock bottom flange or shoe member 15a has its upper face 16a welded to bottom end 17a of said trunk and its bottom face 18a engaging said bottom of said box. Mounting holes 19a are provided for securing said trunk member to said bottom of said box by nuts and bolts (not shown). A foundation portion or oppositely spaced diagonal generally rectangularly outlined steel strip stock brace members 19 are welded securely edgewise to the intermediate portion 20 of said primary trunk, the ends 17, and 18 of said diagonal straddle leg braces being cut on the bias to fit substantially high on the vertical edges 21 of said primary trunk. The diagonally extended ends 22 of said diagonal braces being angularly and widely spaced triangularly from eachother at an angle of approximately 45° the bottoms thereof being trimmed horizontally to fit flanges or leg shoes 23 which shoes have the same general outline of said shoe member 15a, which shoes are then securely welded to said ends of said leg braces in the same manner as for shoe 15a. Mounting holes 24 are likewise provided in said leg shoe portions for bolting said leg shoes scurely to said pick-up box floor adjacent the side 25a of said box by means of nuts and bolts (not shown). Adjacent the top edge of said vertical primary column or trunk member 11, a cantilevered horizontal tire rim supporting member or tubular stub arm member or portion 25 is arc-welded securely centrally to said primary column trunk front face 26 to extend inwardly of said pick-up box. The horizontal arm member 25 is located high enough or approximately 16 inches from the truck floor or shoes generally even with the brace edges 17 and 18 so that when a spare tire is mounted centrally transverse said post, the outer circular tangential portion of the spare tire 27 will substantially clear said floor of said pick-up truck box. A generally annular mounting and backing plate member 28 is welded axially and centrally to said arm member with its flat rear face 28a at right angles thereto thereby closing off the end 29 of said arm member and providing an annular periphery 30 extending outwardly and annularly from the tubular surface 31 of said cantilevered post centrally aproximately 16 inches from the bottom of said trunk member. The outwardly extending peripheral flange portion 31a of said backing plate has three bores or openings 32 through which elongated studs 33 are fixedly mounted radially and secured in place on said plate by nuts 34 on each side 28a, and 35, of said plate 28. A substantial portion 37 of said studs extend inwardly from the sides of said pick-up truck box to receive the mounting holes or openings 36 in said spare tire rim 38. An elongated rim mounting starter extension and locking bar member 39 is welded and fixedly mounted centrally to said backing plate and arranged to extend inwardly from the side of said pick-up truck box generally axially with respect to said cantilevered arm member in the same direction but substantially farther than said stud portions. A generally annular thin, flat, steel locking plate member 40 is provided with an opening 41 adapted to engage loosely the outside periphery 42 of said locking shaft member and a bore 43 is provided in the end of said locking shaft member to receive a padlock 44 or other locking device when said spare tire has been mounted on said mounting studs and said locking plate has been first placed over said locking shaft.

In operation, the locking plate and padlock are removed, the tire rim is slipped over the matching studs. The fastening elements wheel nuts 45 are threaded on said studs holding the rim securely in place. The locking plate is slipped over said lock shaft, the padlock is then secured in said lock shaft bore locking said wheel in place.

Many modifications may be made by those who desire to practice the invention without departing from the scope thereof which is defined by the following claims:

We claim:

1. A specialized tire rim mount for a pick-up truck having a box including a pair of sidewalls and a floor, each said sidewall having an upper flanged edge portion, a spare tire wheel and rim retaining means having a support member adapted to be fixedly fastened to a wheel and rim mount foundation, the improvement in the means for securing said wheel and rim mount in a torsion and torque resisting relationship to said retaining means, said improvement comprising:

the combination of a trunk means including a vertical substanially straight elongated trunk member constructed of heavy gage flat steel strip stock arranged and adapted to extend generally from the trunk bed of the box substantially to the top of the truck box with the outward flat side of said member arranged generally parallel to the side of said box, said trunk member having a generally elongated shoe member rigidly and fixedly mounted transversely to the top end of said trunk member in the general outline of a "T" having spaced fastening elements adapted to mount said shoe member fixedly beneath the upper flanged edge portion of said pick-up truck box for fixedly fastening the top end of said trunk member to the upper flanged edge portion of said pick-up truck box;

a pair of substantially equal length torsion resisting diagonally spaced brace portions constructed of heavy gage flat steel strip stock fixedly and rigidly fastened edgewise at their top ends to the vertical side walls of said trunk member generally planar with said trunk member and substantially equidistant from and adjacent to said top of said trunk member, said brace portions extending diagonally from said trunk member to said pick-up box floor at a generally 45° included angle with each of said brace portions having a generally flat rectangularly outlined shoe member fixedly attached horizontally to the bottom end of each brace portion for fixedly attaching said brace shoe member flush to the bed of said trunk box, said rim retaining support member being attached at its free end fixedly, contiguously, and rigidly to the inward side of said trunk member adjacent the upper ends of said brace portions and a sufficient distance from the bottom of said trunk member and the box floor so that a truck tire will substantially clear the floor when mounted on said retaining means;

cantilevered tire rim supporting means including an annular cantilevered heavy gage tubular stub arm portion having a flatted tube end portion fixedly, contiguously, and rigidly mounted to the inward side of said trunk member and a flatted inwardly directed tube extremity;

an annular tire mounting means including a generally flat, heavy gage steel mounting plate member generally centrally fixedly and rigidly fastened contiguously to said inner directed extremity of said arm stub adjacent to said top ends of said side braces and at least two mounting stubs fixedly, rigidly, and radially mounted on said inward face of said plate member cantilevered inwardly to accept the rim mounting hole spacings of the conventional tire herein involved, said mounting plate being located upwardly a sufficient distance from the bottom of said trunk member so that said tire will substantially clear the bed of the truck box;

and a steel rim mounting starter extension and locking bar member cantileveredly mounted fixedly and rigidly to said inward face of said plate member substantially axially to said stub arm member, the inward tip of said bar member extending inwardly substantially farther than the free extremities of said stud members so that the tire may be rested on said bar to assist in locating the tire rim holes over said stud members, said bar member having a bore at the free extremity thereof for receiving a locking device.

* * * * *